United States Patent Office 3,642,779
Patented Feb. 15, 1972

3,642,779
INDOLO[1,2-d][1,4]BENZODIAZEPIN-6-ONES
Robert Louis Duncan, Jr., and Grover Cleveland Helsley, Richmond, Va., assignors to A. H. Robins Company, Inc., Richmond, Va.
No Drawing. Filed Oct. 22, 1969, Ser. No. 868,574
Int. Cl. C07d 57/02
U.S. Cl. 260—239.3                                    10 Claims

ABSTRACT OF THE DISCLOSURE

Novel indolo[1,2-d][1,4]benzodiazepin-6-ones having pharmacodynamic activity as antidepressants and anticonvulsants are disclosed. The compounds are prepared by acylation of 2-(2-aminophenyl)indoles with haloacetylhalides followed by cyclization under basic conditions. Compounds substituted in the 5-position are prepared by reaction with compounds having displaceable halogens and with isocyanates.

---

This invention relates to novel heterocyclic compounds and is more particularly concerned with indolo[1,2-d][1,4]benzodiazepin-6-ones, therapeutic compositions containing the same as active ingredients and methods of making and administering said compounds and compositions. The novel compounds described hereinafter have utility as physiologically active agents, more particularly they are effective antidepressants and anticonvulsants.

The novel indolo[1,2-d][1,4]benzodiazepin-6-ones are represented by the following structural formula:

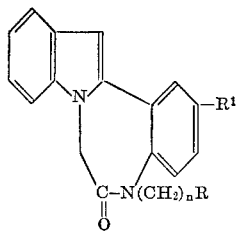

Formula I wherein;

R is selected from the group consisting of hydrogen, hydroxy, 1,2-dihydroxyethyl, lower alkyl-amino, di-lower alkylamino, N-phenylcarbamoyloxy and N,N-diphenylcarbamoyloxy wherein phenyl is unsubstituted phenyl and monosubstituted phenyl, wherein the monosubstituent is selected from lower-alkyl, lower alkoxy, trifluoromethyl and halogen of atomic weight less than eighty;

$R^1$ is selected from the group consisting of hydrogen, lower alkyl, lower alkoxy, trifluoromethyl and halogen of atomic weight less than eighty;

n is a positive integer from zero to four inclusive, and non-toxic acid addition salts thereof.

A preferred group of compounds of the present invention is represented by Formula II:

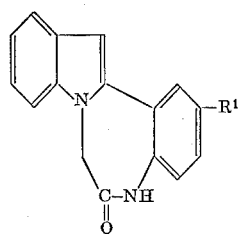

Formula II wherein $R^1$ has the values given hereinabove. The compounds of Formula II, while possessing activity of their own, are also useful as intermediates for the preparation of additional novel compounds of the present invention within the scope of Formula I.

The compounds of Formula I are useful because of their pharmacological action on the central nervous system. The activity is demonstrable when the compounds are used in the form of the free base or in the form of their non-toxic acid addition salts. The preferred form of the novel compounds having a basic substituent in the 5-position is as the non-toxic acid addition salt for increased water solubility and ease of administration.

The compounds of the present invention have demonstrated marked antidepressant activity as measured by their ability to counteract the depressant action induced by 2-oxo-3-isobutyl-9, 10-dimethoxy-1,2,3,4,6,7-hexahydro-11bH-benzo[a]quinolizine tetrabenazine) in mice according to a modified procedure described in Englehardt, E. L. et al., J. Med. Chem. 11(2):325 (1968). The $ED_{50}$'s were determined using the method of J. T. Litchfield and F. Wilcoxin, J. Pharm. and Exptl. Therap., 96, 99 (1949). In particular, among the novel compounds which have been shown to inhibit the effects of tetrabenazine, the compounds of Examples 10 and 11, 5-[2-(N,N - dimethylamino)ethyl]indolo[1,2 - d][1,4]benzodiazepin-6-one hydrochloride hemihydrate, and 5-[3-(N, N - dimethylamino)propyl]indolo[1,2 - d][1,4]benzodiazepin-6-one hydrochloride hemihydrate are preferred. The compounds of the present invention were administered intraperitoneally to mice at doses of about 20 to 100 mg./kg. and after approximately 30 minutes the mice were injected intravenously with 50 mg./kg. of tetrabenazine. The mice were observed for abolition of ptosis and for diminution of exploratory behavior. The compound of Example 10 had an $ED_{50}$ of 20 mg./kg., i.p. and the compound of Example 11 had an $ED_{50}$ of 9.6 mg./kg., i.p.

Certain of the novel compounds of the invention exhibit pharmacological activity of anticonvulsant character. They effectively inhibit convulsions induced by electroshock when tested in cats using the supramaximal electroshock seizure technique of Toman, J. E. P., et al., J. Neurophysiol., 9, 47 (1946). This effect is best demonstrated at a dose level of 25–200 mg./kg. intraperitoneally and preferably at a dose of 25–125 mg./kg. Among the compounds tested for anticonvulsant effect, the compound of Example 2, 2-chloroindolo[1,2-d][1,4]benzodiazepin-6-one, is preferred.

It is, therefore, an object of this invention to provide novel indolo[1,2-d][1,4]benzodiazepin - 6 - ones having utility as antidepressants and anticonvulsants. Another object is to provide methods for producing the novel compounds, therapeutic compositions containing the same and methods for the utilization thereof. Other objects of this invention will be apparent to one skilled in the art and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower alkoxy" has the formula —O-lower-alkyl.

When halogen is referred to herein, preferably but not necessarily a halogen of atomic weight less than eighty is employed.

The term "carbamoyl" includes the N-phenylcarbamoyl radical as well as the N,N-diphenylcarbamoyl radical. The term "carbamoyloxy" has the formula —O-carbamoyl The term "phenyl" includes the unsubstituted and monosubstituted phenyl radicals. Among the suitable substituted phenyl radicals are phenyl radicals substituted by any radical which is not reactive or otherwise interfering under the conditions of reaction, such as lower-alkoxy, lower-alkyl, trifluoromethyl, and halo. The lower-alkyl and lower-alkoxy substituents have preferably from one to four carbon atoms which can be arranged as straight or branched chains.

The compounds of Formula I having a basic substituent in the 5-position may be converted to and are most conveniently employed in the form of non-toxic pharmaceutically acceptable acid addition salts. Such salts also have improved water solubility. Although the non-toxic salts are preferred, any salt may be prepared for use as a chemical intermediate, as in the preparation of another but non-toxic acid addition salt. The free basic compounds of Formula I may be conveniently converted to their acid addition salts by methods known to the art.

Appropriate acid addition salts are those derived from mineral acids such as hydrochloric acid, hydrobromic acid, hydriodic acid, nitric acid, sulfuric acid, and phosphoric acid; and organic acids such as maleic acid, oxalic acid, lactic acid, fumaric acid, and tartaric acid. The preferred acid addition salt is the hydrochloride.

In general, the novel compounds of the present invention are prepared from 2-(2-aminophenyl)indoles which are known in the art. A 2-(2-aminophenyl)indole is dissolved in a buffered solution of a weak acid as, for example, acetic acid buffered with sodium acetate, and is treated with a haloacetylhalide, illustratively, chloroacetylchloride, to give a (2-(2-haloacetamidophenyl)indole. A buffered reaction medium is necessary to prevent spontaneous cyclization of the 2-(2-haloacetamidophenyl)indole to a 6-halomethylindolo[1,2-c]quinazoline. Maximum yields of product are realized when the acylation is run at 0–20° C. and preferably at 5–10° C. and for a period of from about 30 minutes to about two hours. Upon completion of the acylation, an excess of water is added precipitating the 2-(2-haloacetamidophenyl)indole which is isolated by filtration and purified by crystallization from a suitable solvent.

The indolo[1,2-d][1,4]benzodiazepin-6-ones are prepared by cyclization of the 2-(2-haloacetamidophenyl)indoles. The indole is dissolved in an inert organic solvent such as toluene, benzene, dimethylformamide or dimethylsulfoxide, the more polar solvents being preferred, and the solution is added slowly to a suspension of an alkali metal hydride as, for example, sodium hydride, in the selected solvent. The reaction is preferably carried out at the reflux temperature of the solvent used for a period of from about three to five hours. The indolo[1,2-d][1,4]benzodiazepin-6-ones are isolated by adding an excess of water to the cooled reaction mixture and collecting the resulting precipitate. The crystalline products are further purified by crystallization from a suitable solvent.

The novel compounds of Formula I, wherein $n$ is greater than zero, i.e., $n$ is a positive integer from one to four inclusive, are prepared by reacting the indolo[1,2-d][1,4]benzodiazepin-6-ones with lower alkyl halides, omega-hydroxy alkyl halides, 1,2-dihydroxy-3-halopropanes, mono- and dilower alkyl amino-lower alkyl halides, and the like. The indolo[1,2-d][1,4]benzodiazepin-6-one is dissolved in a dry inert solvent such as dimethylformamide or dimethylsulfoxide and the solution is added to an alkali metal hydride or an alkali amide, illustratively sodium hydride or sodium amide, suspended in the solvent used at or about room temperature. The reactants having a displaceable halide are added following cessation of the evolution of gas, and the stirred reaction mixture is generally heated at a temperature of about 50° C. to about 90° C. for a period of from about 30 minutes to 26 hours. The crude products are isolated by extracting the reaction mixture with a suitable organic solvent such as benzene or chloroform. The products are further purified by acid-base extraction of the organic solution followed by crystallization, column chromatography or by conversion to an acid addition salt.

The 5-(omega-hydroxyalkyl)indolo[1,2-d][1,4]benzodiazepin-6-ones prepared by the method described hereinabove are useful intermediates for the preparation of additional compounds within the scope of Formula I. Thus, reacting them with phenyl isocyanates, phenyl- and diphenyl carbamoyl chlorides gives the corresponding 5-(omega-phenyl-, omega-diphenylcarbamoyloxy alkyl)indolo[1,2-d][1,4]benzodiazepin-6-ones. The reactions are generally carried out in a dry inert organic solvent as, for example, benzene, chloroform, tetrahydrofuran, and the like, at ambient to reflux temperatures of the solvent employed and for a period of from about two hours to about twenty hours. The products are usually isolated from the reaction mixture by evaporation of the solvent and purified by crystallization from an appropriate solvent.

PREPARATION OF INTERMEDIATES

PREPARATION 1

2-(2-aminophenyl)indole

A mixture of 150.0 g. (0.67 mole) of the phenylhydrazone of 2-aminoacetophenone and 500.0 g. of polyphosphoric acid was stirred on a steam bath until a color change from yellow to brown appeared. The stirred mixture was cooled in ice water while an exothermic reaction occurred raising the pot temperature to 125° C. After cooling, an excess of cold water was added to decompose the excess polyphosphoric acid. The mixture was filtered, the solid residue was dissolved in dilute sodium hydroxide and extracted with ether. The combined ether extracts were dried and concentrated. The solid residue which was recrystallized from methanol melted at 153–154° C. and weighed 75 g. (54% yield).

*Analysis.*—Calculated for $C_{14}H_{12}N_2$ (percent): N, 13.45. Found (percent): N, 13.32.

PREPARATION 2

2(2-amino-5-chlorophenyl)indole

A mixture of 2.0 g. (0.039 mole) of the phenylhydrazone of 2-amino-5-chloroacetophenone and 50.0 g. of polyphosphoric acid was stirred and heated to 125–130° C. At this point an exothermic reaction raised the temperature to 150° C. The reaction mixture was stirred with the temperature maintained between 140–150° C. for 10 minutes. An excess of water was added to the cooled mixture. The solid which separated was collected by filtration and partitioned between dilute sodium hydroxide and ether. The ether layer was dried and concentrated. The indole which weighed 7.9 g. (85%) was recrystallized from chloroform and melted at 102–105° C.

*Analysis.*—Calculated for $C_{14}H_{11}ClN_2$ (percent): H, 69.28; H, 4.57; N, 11.54. Found (percent): C, 68.91; H, 4.51; N, 11.46.

PREPARATION 3

2-(2-amino-5-bromophenyl)indole

A mixture of 6.5 g. (0.021 mole) of the phenylhydrazone of 2-amino-5-bromoacetophenone and 20 g. of polyphosphoric acid was heated to about 100° C. where an exothermic reaction raised the pot temperature to 130° C. The temperature was maintained at 130° C. for 10 minutes and the mixture was cooled to about 90° C. An excess of water was added and the mixture was filtered. The collected solid was dissolved in ethanol and the solution was made basic. The base insoluble product was extracted with chloroform and the combined extracts were dried and concentrated. The residue was recrystallized from ethanol and 3.5 g. (60%) of product was obtained which melted at 137–140° C.

*Analysis.*—Calculated for $C_{14}H_{11}BrN_2$ (percent): C, 58.55; H, 3.86; N, 9.76. Found (percent): C, 58.73; H, 3.92; N, 9.59.

Utilizing the procedures of Preparations 1–3, the following 2 - (2 - amino - 5 - substituted - phenyl)indoles are prepared:

2-(2-amino-5-methoxyphenyl)indole is prepared by reacting the phenylhydrazone of 2-amino-5-methoxyacetophenone and polyphosphoric acid;

2-(2-amino-5-trifluoromethylphenyl)indole is prepared by reacting the phenylhydrazone of 2-amino-5-trifluoromethylacetophenone and polyphosphoric acid;

2-(2-amino-5-ethylphenyl)indole is prepared by reacting the phenylhydrazone of 2-amino-5-ethylacetophenone and polyphosphoric acid;

2-(2-amino-5-fluorophenyl(indole is prepared by reacting the phenylhydrazone of 2-amino-5-fluoroacetophenone and polyphosphoric acid;

2-(2-amino-5-methylphenyl)indole is prepared by reacting the phenylhydrazone of 2-amino-5-methylacetophenone and polyphosphoric acid.

PREPARATION 4

2-(2-chloroacetamidophenyl)indole

To a stirred solution of 4.2 g. (0.02 mole) of 2-(2-aminophenyl)indole in 150 ml. of acetic acid was added a solution of 6.6 g. (0.08 mole) of sodium acetate in 20 ml. of water. The mixture was cooled to 20° C. and 4.5 g. (0.04 mole) of chloroacetylchloride was added slowly. After the addition was completed, stirring was continued for 30 minutes and 150 ml. of water was added to the reaction flask. The crystalline solid which precipitated was collected by filtration, dissolved in benzene and washed with water. The solvent was evaporated and the residual material which crystallized on cooling was recrystallized from isopropyl ether. The white product weighed 2.5 g. (43% yield) and melted at 108.5–110° C.

*Analysis.*—Calculated for $C_{16}H_{13}N_2OCl$ (percent): C, 67.49; H, 4.60; N, 9.84. Found (percent): C, 67.67; H, 4.66; N, 9.70.

PREPARATION 5

2-(2-chloroacetamido-5-chlorophenyl)indole

In a similar manner to Preparation 4, 3.3 g. (0.0136 mole) of 2-(2-amino-5-chlorophenyl)indole dissolved in acetic acid containing 4.1 g. (0.05 mole) of sodium acetate was acrylated with 3.0 g. (0.027 mole) of chloroacetylchloride. The temperature was maintained below 10° C. during acylation. The crude product was crystallized from isopropyl ether, weighed 4.1 g. (94% yield) and melted at 155–158° C.

*Analysis.*—Calculated for $C_{16}H_{12}N_2OCl_2$ (percent): C, 60.20; H, 3.79; N, 8.78. Found (percent): C, 61.12; H, 3.88; N, 8.63.

PREPARATION 6

2-(2-chloroacetamido-5-bromophenyl)indole

In a similar manner to Preparation 4, 103 g. (0.36 mole) of 2-(2-amino-5-bromophenyl)indole dissolved in acetic acid containing 132 g. (1.60 mole) of sodium acetate was acylated with 45.3 g. (0.40 mole) of chloroacetylchloride at a temperature below 10° C. The product was crystallized from methanol-isopropyl ether, weighed 114.5 g. (87.5% yield) and melted at 158–162° C.

*Analysis.*—Calculated for $C_{16}H_{12}N_2OClBr$ (percent): C, 52.85; H, 3.33; N, 7.70. Found (percent): C, 53.09; H, 3.37; N, 7.59.

The following 2-(2-chloroacetamido-5-substituted-phenyl)indoles are prepared by acylation of the corresponding 2-(2-amino-5-substituted-phenyl)indoles with chloroacetylchloride in the presence of acetic acid buffered with sodium acetate in accordance with the procedure of Preparations 4 through 6:

2-(2-chloroacetamido-5-methoxyphenyl)indole;
2-(2-chloroacetamido-5-trifluoromethylphenyl)indole;
2-(2-chloroacetamido-5-ethylphenyl)indole;
2-(2-chloroacetamido-5-fluorophenyl)indole;
2-(2-chloroacetamido-5-methylphenyl)indole.

The examples below illustrate in detail some of the compounds which comprise this invention and methods for their production. However, this invention is not to be construed as limited thereby in spirit or scope. It will be apparent to one skilled in the art that numerous modifications in materials and methods can be adopted without departing from the invention.

EXAMPLE 1

Indolo[1,2-d][1,4]benzodiazepin-6-one

A solution of 6.0 g. (0.02 mole) of 2-(2-chloroacetamidophenyl)indole in 50 ml. of dimethylformamide was added slowly to a suspension of 0.51 g. (0.021 mole) of sodium hydride in 150 ml. of dimethylformamide. The mixture was refluxed four hours. An excess of water was added to the cooled reaction mixture and the precipitate was collected by filtration and air dried. The crude crystalline product which weighed 4.5 g. (86%) was recrystallized from methyl isobutyl ketone and melted at 278–281° C.

*Analysis.*—Calculated for $C_{16}H_{12}N_2O$ (percent): C, 77.40; H, 4.87; N, 11.28. Found (percent): C, 77.14; H, 5.00; N, 11.18.

EXAMPLE 2

2-chloroindolo[1,2-d][1,4]benzodiazepin-6-one

A solution of 3.0 g. (0.0094 mole) of 2-(5-chloro-2-chloroacetamidophenyl)indole in 25 ml. of dimethylformamide was added slowly to a mixture of 0.24 g. (0.01 mole) of sodium hydride in 100 ml. of dimethylformamide. The mixture was refluxed four hours. After cooling, an excess of water was added to the reaction mixture and the resulting precipitate was collected by filtration and recrystallized from isopropyl ether. The product weighed 1.4 g. (50% yield) and melted at 257–260° C. with decomposition.

*Analysis.*—Calculated for $C_{16}H_{11}C_1N_2O$ (percent): C, 67.97; H, 3.92; N, 9.91. Found (percent): C, 68.47; H, 3.94; N, 9.73.

EXAMPLE 3

2-bromoindolo[1,2-d][1,4]benzodiazepin-6-one

A slurry of 105 g. (0.29 mole) of 2-(5-bromo-2-chloroacetamidophenyl) indole in 100 ml. of dimethylformamide was slowly added to a stirred suspension of 7.2 g. (0.30 mole) of sodium hydride in 50 ml. of dimethylformamide. The addition required approximately three hours after which the mixture was refluxed two hours. One liter of water was added to the cooled reaction mixture and a tan solid separated. The crude product was collected by filtration and triturated in a cold methanol-water solution. The solid which was air-dried weighed 95 g. (100% yield). A 6 g. sample was recrystallized from benzene and melted at 267–269° C.

*Analysis.*—Calculated for $C_{16}H_{11}BrN_2O$ (percent): C, 58.73; H, 3.39; N, 8.56. Found (percent): C, 58.81; H, 3.49; N, 8.47.

Utilizing the procedure of Examples 1 through 3, the following 2-substituted indolo[1,2-d][1,4]benzodiazepin-6-ones are prepared by cyclization of the corresponding 2-(5-substituted-2-chloroacetamidophenyl)indole:

2-methoxyindolo[1,2-d][1,4]benzodiazepin-6-one;
2-trifluoromethylindolo[1,2-d][1,4]benzodiazepin-6-one;
2-ethylindolo[1,2-d][1,4]benzodiazepin-6-one;
2-fluoroindolo[1,2-d][1,4]benzodiazepin-6-one;
2-methylindolo[1,2-d][1,4]benzodiazepin-6-one.

EXAMPLE 4

5-methylindolo[1,2-d][1,4]benzodiazepin-6-one

To a stirred mixture of 0.77 g. (0.032 mole) of sodium hydride in 100 ml. of anhydrous dimethylformamide was added a solution of 8.0 g. (0.032 mole) of indolo[1,2-d][1,4]benzodiazepin - 6-one in 25 ml. of dimethylformamide. A moderate evolution of hydrogen was maintained during the addition. After the evolution of gas ceased, a solution of 5.7 g. (0.04 mole) of methyl iodide in 10 ml. of dimethylformamide was added dropwise. The reaction mixture was stirred one hour at room temperature and an excess of water was carefully added. The mixture was extracted with benzene and the benzene extracts were dried over anhydrous sodium sulfate, filtered and concentrated. The crude residue was recrystallized from chloroform-isopropyl ether and 3.0 g. (34%) of product melting at 129–131° C. was obtained.

*Analysis.*—Calculated for $C_{17}H_{14}N_2O$ (percent): C, 77.84; H, 5.38; N, 10.68. Found (percent): C, 77.87; H, 5.47; N, 10.70.

EXAMPLE 5

2-bromo-5-methylindolo[1,2-d][1,4]benzodiazepin-6-one

A solution of 15 g. (0.046 mole) of 2-bromoindolo[1,2-d][1,4]benzodiazepin-6-one in 60 ml. of dry dimethylformamide was slowly added to a stirred suspension of 2.04 g. (0.046 mole) of sodium hydride in 100 ml. of dry dimethylformamide. After the addition was complete, the reaction mixture was heated to about 60° C. for 15 minutes and cooled to room temperature. A solution of 7.3 g. (0.05 mole) of methyl iodide in 15 ml. of dimethylformamide was added dropwise and stirring was continued one hour. The reaction mixture was carefully added to 500 ml. of water and extracted with benzene. The benzene extracts were washed with water, dried over magnesium sulfate and concentrated. The crude oil was chromatographed on a magnesium silicate column and the product was eluted using a gradient elution of acetone-benzene. The product was recrystallized from benzene-isooctane, melted at 95–98° C. and weighed 7.0 g. (44.6%):

*Analysis.*—Calculated for $C_{17}H_{13}BrN_2O$ (percent): C, 59.84; H, 3.84; N, 8.21. Found (percent): C, 60.23; H, 4.09; N, 7.95.

EXAMPLE 6

5-(2-hydroxyethyl)indolo[1,2-d][1,4-]benzodiazepin-6-one

A solution of 20 g. (0.081 mole) of indolo[1,2-d][1,4]benzodiazepin-6-one in 300 ml. of dimethylformamide was added dropwise to a stirred suspension of 2.14 g. (0.089 mole) of sodium hydride in 200 ml. of anhydrous dimethylformamide. The mixture was stirred under nitrogen until the evoltuion of hydrogen ceased. A solution of 10.1 g. (0.081 mole) of 2-bromoethanol in 25 ml. of dimethylformamide was added dropwise to the reaction mixture and the solution was heated at 75–85° C. for 24 hours. Water was added to the cooled reaction mixture and the aqueous mixture was extracted with benzene. The benzene extracts were dried and concentrated. The residual solid was crystallized from isopropyl ether to give 17 g. (75%) of product. The product was recrystallized from benzene-isooctane and melted at 147–150° C.

*Analysis.*—Calculated for $C_{18}H_{16}N_2O_2$ (percent): C, 73.95; H, 5.52; N, 9.59. Found (percent): C, 73.85; H, 5.51; N, 9.58.

EXAMPLE 7

2-bromo-5-(2-hydroxyethyl)indolo[1,2-d][1,4]benzodiazepin-6-one

Using the procedure of Example 6, 32.7 g. (0.1 mole) of 2-bromoindolo[2,1-d][1,4]benzodiazepin-6-one in 300 ml. of dimethylformamide was reacted with 5.3 g. (0.12 mole) of sodium hydride in 200 ml. of dry dimethylformamide followed by the addition of 12.5 g. (0.1 mole) of 2-bromoethanol in 25 ml. of dimethylformamide. The crude product was isolated and crystallized from isopropyl ether to give 26.7 g. (72%) of material which was dissolved in benzene and chromatographed on a magnesium silicate column. Using a gradient elution of benzene-acetone, 6 g. of product melting at 135–138° C. was obtained.

*Analysis.*—Calculated for $C_{18}H_{15}BrN_2O_2$ (percent): C, 58.24; H, 4.07; N, 7.55. Found (percent): C, 58.52; H, 4.08; N, 7.50.

EXAMPLE 8

5-{2-[N-(3-chlorophenyl)carbamoyloxy]ethyl}indolo-[1,2-d][1,4]benzodiazepin-6-one To a stirred solution of 6.1 g. (0.021 mole) of 5-(2-hydroxyethyl)indolo[1,2-d][1,4]benzodiazepin-6-one in 100 ml. of tetrahydrofuran was added 3.5 g. (0.023 mole) of 3-chlorophenylisocyanate. The mixture was stirred 20 hours and concentrated. The residual oil was triturated in methylene chloride and a white crystalline solid separated. The solid was confirmed by nuclear magnetic resonance to be di-(3-chlorophenyl)urea. The solid was removed by filtration and the filtrate was concentrated. The oily residue was triturated in ether and the solid was collected by filtration. The white crystalline product which weighed 3.5 g. (38%) was recrystallized from chloroform-ether and melted at 136–139° C.

*Analysis.*—Calculated for $C_{25}H_{20}ClNO_3$ (percent): C, 67.34; H, 4.52; N, 9.42. Found (percent): C, 67.07; H, 4.46; N, 9.30.

EXAMPLE 9

5-(2,3-dihydroxypropyl)indolo[1,2-d][1,4]benzodiazepin-6-one

Using the procedure of Example 6, 8.0 g. (0.032 mole) of indolo[1,2-d][1,4]benzodiazepin-6-one in 50 ml. of dry dimethylformamide was reacted with 1.7 g. (0.035 mole) of sodium hydride in 75 ml. of dry dimethylformamide followed by the addition of 3.6 g. (0.032 mole) of 3-chloro-1,2-propanediol in 25 ml. of dry dimethylformamide. The crude product was isolated from the reaction mixture and was recrystallized several times from chloroform-isopropyl ether to give 1.5 g. (14.4%) of product which melted at 198–204° C.

*Analysis.*—Calculated for $C_{19}H_{18}N_2O_3$ (percent): C, 70.79; H, 5.63; N, 8.69. Found (percent): C, 70.44; H, 5.56; N, 8.71.

EXAMPLE 10

5-[2-(N,N-dimethylamino)ethyl]indolo[1,2-d][1,4]benzodiazepin-6-one hydrochloride hemihydrate A solution of 5.0 g. (0.02 mole) of indolo[1,2-d][1,4]benzodiazepin-6-one in 25 ml. of dimethylformamide was slowly added to a stirring suspension of 0.98 g. (0.04 mole) of sodium hydride in 50 ml. of dimethylformamide. After the evolution of gas subsided, a solution of 3.0 g. (0.021 mole) of 2-dimethylaminoethylchloride hydrochloride in 25 ml. of dimethylformamide was slowly added. The mixture was stirred at 70–75° C. four hours. The cooled reaction mixture was filtered and the filtrate was concentrated. The residue was dissolved in benzene and acid-base extracted. The benzene extracts were dried and concentrated. The crude residue which weighed 4.7 g. (74%) was converted to the hydrochloride salt and recrystallization from isopropanol gave the product which melted at 190–200° C.

*Analysis.*—Calculated for $C_{40}H_{48}Cl_2N_6O_3$ (percent): C, 65.84; H, 6.35; N, 11.52. Found (percent): C, 65.93; H, 6.39; N, 11.52.

EXAMPLE 11

5-[3-(N,N-dimethylamino)propyl]indolo[1,2-d][1,4]benzodiazepin-6-one hydrochloride hemihydrate Using the procedure of Example 10, 15.0 g. (0.06 mole) of indolo[1,2-d][1,4]benzodiazepin-6-one in 50 ml. of dimethylformamide was reacted with 1.45 g. (0.06 mole) of sodium hydride in 150 ml. of dimethylformamide followed by the addition of 7.4 g. (0.06 mole) of 3-(N,N-dimethylamino)propyl chloride in 25 ml. of dimethylformamide. The crude product was isolated from the reaction mixture and chromatographed on a magnesium silicate column using a benzene-acetone gradient elution. The main fraction weighed 8 g. (40%). A small sample was molecularly distilled for analysis.

*Analysis.*—Calculated for $C_{21}H_{23}N_3O$ (percent): C, 75.64; H, 6.95; N, 12.60. Found (percent): C, 75.36; H, 6.89; N, 12.47.

The hydrochloride salt hydrate which was prepared was filtered under a dry nitrogen atmosphere and melted at 165–170° C.

*Analysis.*—Calculated for $C_{42}H_{50}Cl_2N_6O_3$ (percent): C, 66.56; H, 6.65; N, 11.09. Found (percent): C, 66.17; H, 6.35; N, 11.03.

EXAMPLE 12

2-bromo-5-[2-(N,N-dimethylamino)ethyl]indolo[1,2-d][1,4]benzodiazepin-6-one hydrochloride hydrate Using the procedure of Example 10, 10.9 g. (0.0305 mole) of 2-bromoindolo[1,2-d][1,4]benzodiazepin-6-one in 50 ml. of dimethylformamide was reacted with 1.47 g. (0.061 mole) of sodium hydride in 100 ml. of dimethylformamide followed by the addition of 4.58 g. (0.0305 mole) of 2-(N,N-dimethylamino)ethyl chloride hydrochloride in 50 ml. of dimethylformamide. The product was isolated from the reaction mixture and 6.5 g. (59%) of the free base was obtained. The hydrochloride salt was prepared and obtained as the monohydrate which melted at 145° C. At this point the compound softened and melted over a wide range.

*Analysis.*—Calculated for $C_{20}H_{23}BrClN_3O_2$ (percent): C, 53.05; H, 5.12; N, 9.28. Found (percent): C, 53.34; H, 4.76; N, 9.19.

EXAMPLE 13

2-bromo-5-[3-(N,N-dimethylamino)propyl]indolo[1,2-d][1,4]benzodiazepin-6-one hydrochloride hydrate Using the procedure of Example 10, 20.0 g. (0.054 mole) of 2-bromoindolo[1,2-d][1,4]benzodiazepin-6-one in 100 ml. of dry dimethylformamide was reacted with 2.45 g. (0.054 mole) of sodium hydride in 100 ml. of dimethylformamide. The reaction mixture was heated at 70° C. for two hours followed by the addition of 3-(N,N-dimethylamino)propyl chloride in 25 ml. of dimethylformamide. The crude product was isolated from the reaction mixture and a glass-like residue weighing 11.7 g. (53%) was obtained. The hydrochloride salt was prepared and isolated as the monohydrate which melted over a range of 145–150° C.

*Analysis.*—Calculated for $C_{21}H_{25}BrClN_3O_2$ (percent): C, 54.03; H, 5.39; N, 9.00. Found (percent): C, 54.09; H, 5.02; N, 8.81.

Utilizing the procedures of Examples 3 through 13, the following compounds are prepared:

2-chloro-5-[3-(N,N-dimethylamino)propyl]indolo[1,2-d][1,4]benzodiazepin-6-one is prepared by reacting 2-chloroindolo[1,2-d][1,4]benzodiazepin-6-one with sodium hydride followed by addition of 3-(N,N-dimethylamino)propylchloride;

2-trifluoromethyl-5-[2-(N,N-dimethylamino)ethyl]indolo[1,2-d][1,4]benzodiazepin-6-one is prepared by reacting 2-trifluoromethylindolo[1,2-d][1,4]benzodiazepin-6-one with sodium hydride followed by addition of 2-(N,N-diethylamino)ethyl chloride;

2-ethyl-5-ethylindolo[1,2 - d][1,4]benzodiazepin-6-one is prepared by reacting 2-ethylindolo[1,2-d][1,4]benzodiazepin-6-one with sodium hydride followed by addition of ethyl bromide;

2-methoxy-5-[4 - (N - methylamino)butyl]indolo[1,2-d][1,4]benzodiazepin-6-one is prepared by reacting 2-methoxyindolo[1,2 - d][1,4]benzodiazepin-6-one with sodium hydride followed by addition of 4-(N-methylamino)butyl chloride;

2-fluoro-5-(3 - hydroxypropyl)indolo[1,2 - d][1,4]benzodiazepin-6-one is prepared by reacting 2-fluoroindolo[1,2-d][1,4]benzodiazepin-6-one with sodium hydride followed by addition of 3-bromopropanol;

2-fluoro-5-{3-[N,N-di-(4-methoxyphenyl)carbamoyloxy]propyl}indolo[1,2-d][1,4]benzodiazepin-6-one is prepared by reacting 2-fluoro-5-(3-hydroxypropyl)indolo[1,2-d][1,4]benzodiazepin-6-one with N,N-di-(4-methoxyphenyl)carbamoyl chloride;

2-bromo-5-{2-[N-(3-trifluoromethylphenyl)carbamyloxy]ethyl}indolo[1,2-d][1,4]benzodiazepin - 6 - one is prepared by reacting 2-bromo-5-(2-hydroxyethyl)indolo[1,2-d][1,4]benzodiazepin-6-one with 3-trifluoromethylphenyl isocyanate;

2-chloro-5-methylindolo[1,2 - d][1,4]benzodiazepin-6-one is prepared by reacting 2-chloroindolo[1,2-d][1,4]benzodiazepin-6-one with sodium hydride followed by addition of methyl iodide; and 2-chloro-5-butylindolo[1,2-d][1,4]benzodiazepin-6-one is prepared by reacting 2-chloroindolo[1,2-d][1,4]benzodiazepin-6-one with butylbromide.

FORMULATION AND ADMINISTRATION

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic and silicic acids, magnesium stearate, and polyvinyl pyrrolidone.

For parenteral administration the carrier or excipient may be a sterile, parenterally acceptable liquid; e.g., water or a parenterally acceptable oil; e.g., arachis oil contained in ampules.

Advantageously, the compositions may be formulated as dosage units, each unit being adapted to supply a fixed dose of active ingredients. Tablets, capsules, coated tablets and ampules are examples of preferred dosage unit forms according to the invention. Although small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appear to be optimum per unit dose, while usual broader ranges appear to be one to 500 milligrams per unit dose. It is only necessary that the active ingredient constitute an effective amount; i.e., such that a suitable effective dosage will be obtained consistent with the dosage form employed. Obviously, several unit dosage forms may be administered at about the same time.

The followiwng are examples of compositions formed in accordance with this invention.

(1) Capsules—Capsules of 5, 25, and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient | 5.0 |
| Lactose | 296.7 |
| Starch | 129.0 |
| Magnesium stearate | 4.3 |
| Total | 435.0 |

(2) Tablets—A typical formulation for a tablet containing 5 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.2 |
| (6) Calcium stearate | 0.9 |
| Total | 170.3 |

Uniformly blend 1, 2, 4 and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 mg. Tablet

| Ingredients: | Per tablet, mg. |
|---|---|
| Active ingredient | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(3) Injectable—2% sterile solution:

| | Per cc. |
|---|---|
| Active ingredient | mg. 20 |
| Preservative, e.g., chlorobutanol wt./vol. | 0.5% |
| Water for injection | q.s. |

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:

1. A compound selected from the group consisting of
  (a) indolo[1,2-d][1,4]benzodiazepin-6-ones having the formula:

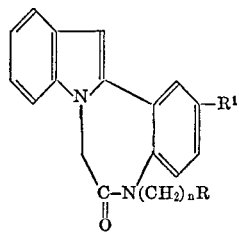

wherein;
R is selected from the group consisting of hydrogen, 1,2-dihydroxyethyl, hydroxy, lower alkylamino, di-lower alkyl-amino, N-phenylcarbamoyloxy and N,N-diphenylcarbamoyloxy, wherein phenyl is the phenyl radical and the monosubstituted phenyl radical wherein the substituent is selected from lower alkyl, lower alkoxy, trifluoromethyl and halogen of atomic weight less than eighty;

$R^1$ is selected from the group consisting of hydrogen, lower alkyl, lower alkoxy, trifluoromethyl and halogen of atomic weight less than eighty, n is a positive integer from one to four inclusive, and (b) non-toxic acid addition salts.

2. A compound according to claim 1 which is 5-[2-(N,N-dimethylamino)ethyl]indolo[1,2-d][1,4]benzodiazepin-6-one.

3. A compound according to claim 1 which is 5-[3-(N,N-dimethylamino)propyl]indolo[1,2-d][1,4]benzodiazepin-6-one.

4. A compound according to claim 1 which is 2-bromo-5-[2-(N,N-dimethylamino)ethyl]indolo[1,2-d][1,4]benzodiazepin-6-one.

5. A compound according to claim 1 which is 5-methylindolo[1,2-d][1,4]benzodiazepin-6-one.

6. A compound according to claim 1 which is 2-bromo-5-methylindole[1,2-d][1,4]benzodiazepin-6-one.

7. A compound selected from the group consisting of indolo[1,2-d][1,4]benzodiazepin-6-ones having the formula:

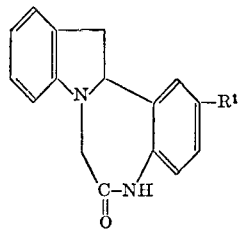

wherein $R^1$ is selected from the group consisting of hydrogen, lower alkyl, lower alkoxy, trifluoromethyl and halogen of atomic weight less than eighty.

8. A compound according to claim 7 which is 2-chloroindolo[1,2-d][1,4]benzodiazepin-6-one.

9. A compound according to claim 7 which is indolo[1,2-d][1,4]benzodiazepin-6-one.

10. A process for the preparation of indolo[1,2-d][1,4]benzodiazepin-6-ones having the formula:

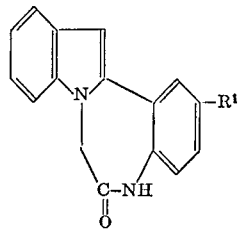

wherein $R^1$ is selected from the group consisting of lower alkyl, lower alkoxy, trifluoromethyl and halogen of atomic weight less than eighty, which comprises the step of reacting a 2-(2-haloacetamidophenyl)indole having the formula

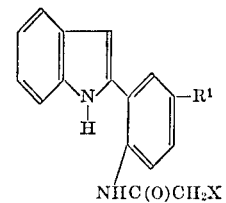

wherein $R^1$ is as defined hereinabove and X is halogen, with an alkali metal hydride to give an indolo[1,2-d][1,4]benzodiazepin-6-one.

References Cited

UNITED STATES PATENTS 3,375,246   3/1968   Hardtmann et al. __ 260—239.3

HENRY R. JILES, Primary Examiner
R. T. BOND, Assistant Examiner

U.S. Cl. X.R.
424—244, 274; 260—326.13, 326.15